Aug. 21, 1962  S. L. GILLESPIE  3,049,867
GOVERNOR FOR TURBO-SUPERCHARGED PRIME MOVERS
Filed Sept. 21, 1959  2 Sheets-Sheet 1

INVENTOR
Sidney Lockwood Gillespie
By Wolf, Hubbard, Voit & Osann
ATTORNEY

Aug. 21, 1962 S. L. GILLESPIE 3,049,867
GOVERNOR FOR TURBO-SUPERCHARGED PRIME MOVERS
Filed Sept. 21, 1959 2 Sheets-Sheet 2
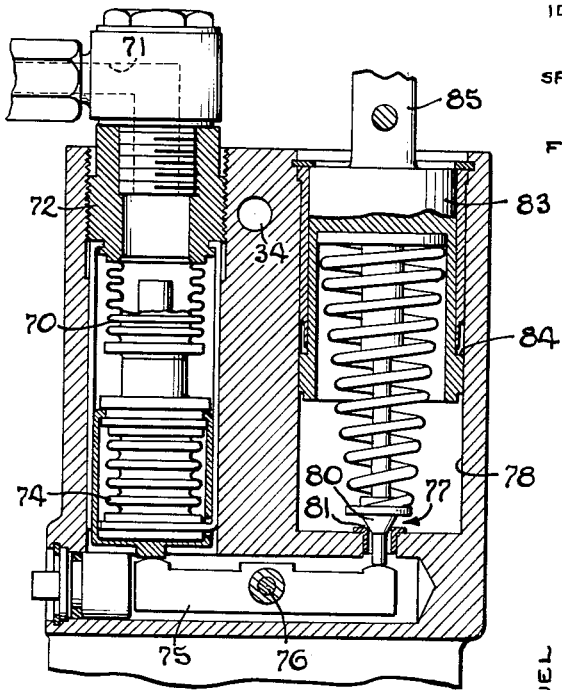
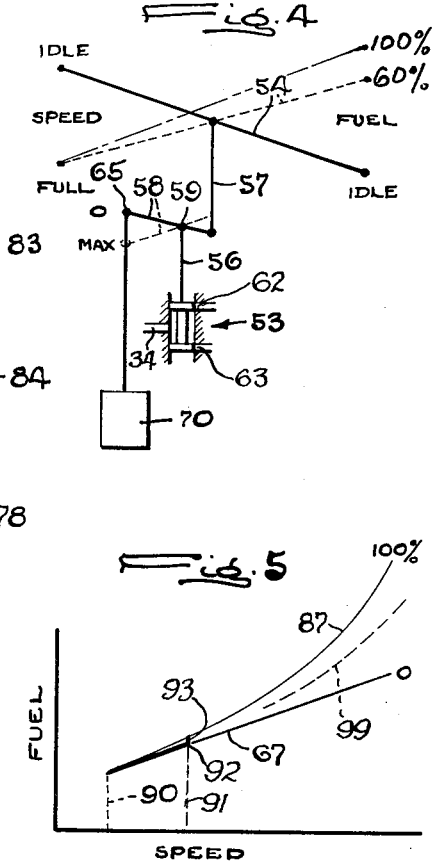
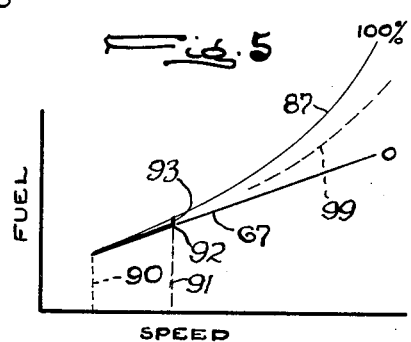
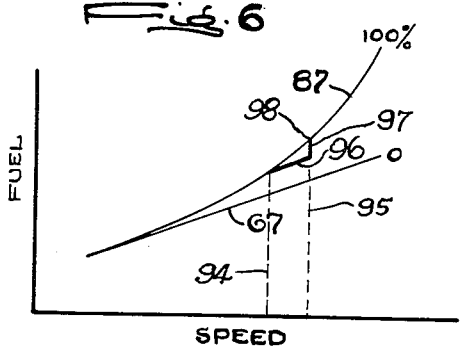
INVENTOR
Sidney Lockwood Gillespie
By Wolfe, Hubbard, Voit & Osann
ATTORNEYS 3,049,867
GOVERNOR FOR TURBO-SUPERCHARGED
PRIME MOVERS
Sidney Lockwood Gillespie, Rockford, Ill., assignor to Woodward Governor Company, Rockford, Ill., a corporation of Illinois
Filed Sept. 21, 1959, Ser. No. 841,077
7 Claims. (Cl. 60—13)

This invention relates to a speed responsive governor for controlling a fuel burning prime mover supplied with combustion air by an exhaust gas driven supercharger.

The general object is to control the flow of fuel to a prime mover of the above character so as to achieve optimum efficiency and maximum power output under all of the varying conditions encountered in service use.

Another object is to correlate at all times the load on the prime mover with the prevailing speed and fuel flow and then modify this relationship continuously in accordance with the prevailing output of the turbo-supercharger so as to compensate for variations in air delivery due to the inability of the supercharger to closely follow changes in the prime mover speed or load or any deficiency in the charging system which may develop in service.

The invention also resides in the novel manner of combining the speed, fuel flow, and air pressure signals and utilizing the resultant in regulating the loading of the prime mover.

Other objects and advantages of the invention will become apparent from the following detailed description taken in connection with the accompanying drawings, in which FIGURE 1 is a schematic view of a diesel engine equipped with a control embodying the novel features of the present invention.

FIG. 3 is a fragmentary sectional view of the air pressure sensing device.

FIG. 4 is a schematic view of one form of mechanism for adjusting the load controller.

FIGS. 5 and 6 are characteristic curves of the speed-fuel flow relationship obtained with the improved control.

Figure 1:
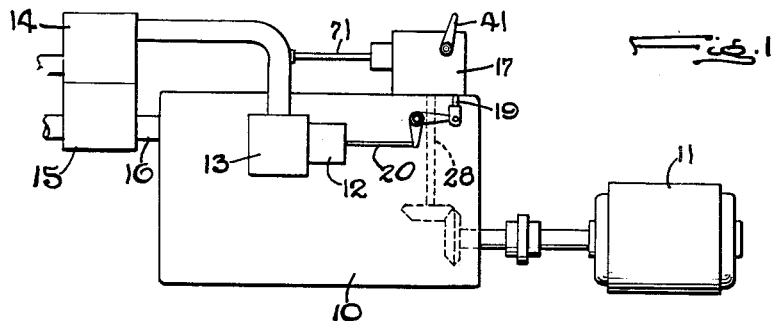

The improved control is especially adapted for regulating the flow of fuel to a diesel engine 10 coupled to an electric generator 11 for supplying current to the driving motors of a locomotive subject in service use to various changes in ambient temperature and altitude. A pump 12 driven by the engine delivers fuel under pressure to the fuel injectors which discharge the fuel into the engine. The cylinders receive air from a manifold 13 which is charged under pressure by a centrifugal blower or supercharger 14. The latter is coupled to a turbine 15 driven by exhaust gases discharged from the engine through a pipe 16.

The rate of fuel supply to the engine is regulated automatically by a governor 17 responsive to changes in the engine speed and having a servo actuator 18 whose output rod 19 is coupled through suitable linkage to the control rod or throttle 20 of the engine. The actuator shown is of the single acting hydraulic type comprising a piston 21 reciprocable in a stationary cylinder 22 supported within the housing 23 mounted on the engine. The regulator rod 19 is urged in the speed decreasing direction by a compression spring 24. Fluid under pressure is introduced into or withdrawn from the rod end of the cylinder through a passage 25 to control the energization of the servo and therefore the position of the regulator rod.

The speed governor shown herein is of the dropless or isochronous type as disclosed in Patent 2,478,753, to which reference may be had for further details. Oil contained within the governor casing 23 is placed under a constant pressure by a spring loaded by-pass valve 26 and a gear pump 27 driven by the engine through a shaft 28 coupled to a ported sleeve 29 carrying the governor ball head 30 and cooperating with a land 31 on a stem 32 to form a pilot valve 33. The latter controls the flow of pressure fluid from the supply line 34 to a space 35 or the escape of fluid from this space to a drain space 36.

The valve stem is slidable in the sleeve 29 and fixed to a head 37 urged downwardly by a compression type speeder spring 38 and upwardly by centrifugal force derived from flyweights 39 fulcrumed at 39ª on the rotating ball head 30. The stress of the spring and therefore the setting of the governor to maintain different desired engine speeds is determined by the position of an abutment 40 adjustable in this instance by a manually actuated lever 41.

Pressure changes in the valve control space 35 are transmitted to the servo cylinder 22 through a spring loaded buffer piston 42 cooperating with a restriction 43 and the fluid passages shown to derive a pressure differential as an incident to each corrective action of the governor. As described in the aforesaid patent, these differentials are in opposite senses for speed increases and decreases and are applied to a piston 44 on the valve stem 32 in a direction to return the land 31 to neutral position following each speed change. This produces a drooping characteristic and stabilizing effect which is then dissipated by gradual leakage of fluid between opposite ends of the piston 42 and through the restriction 43. As a result, the governor regulates the fuel flow to maintain constant speed and isochronous operation of the engine.

To force the engine to carry a desired load at each selected speed, the automatic fuel control above described is combined with a device 46 for varying the loading of the engine so as to maintain a predetermined relationship at all times between the engine speed and the rate of fuel flow. While various types of reversible power servos may be employed, the device shown herein is a hydraulic servo having a vane 48 swingable within a casing 49 and coupled to a voltage regulator 50 for varying the excitation of the generator 11 and therefore the loading of the engine. The admission of pressure fluid to or the release of such fluid from the spaces 51 and 52 on opposite sides of the vane is controlled by a pilot valve 53 which is positioned in accordance with a combination of engine speed and delivered torque to produce the desired characteristic curve. The position of the speed adjuster 40 is used as a convenient and approximate indication of prevailing engine speed while the fuel flow as determined by the position of the servo piston 21 is an approximate measure of engine torque. While these signals may be combined in various ways and by various types of electrical, pneumatic, hydraulic or mechanical devices, the combination is preferably achieved mechanically through the use of a floating lever 54 pivotally connected at one end to the speed adjuster 40 and at the other end to an extension 55 of the rod of the fuel adjusting piston 21.

Figure 2:
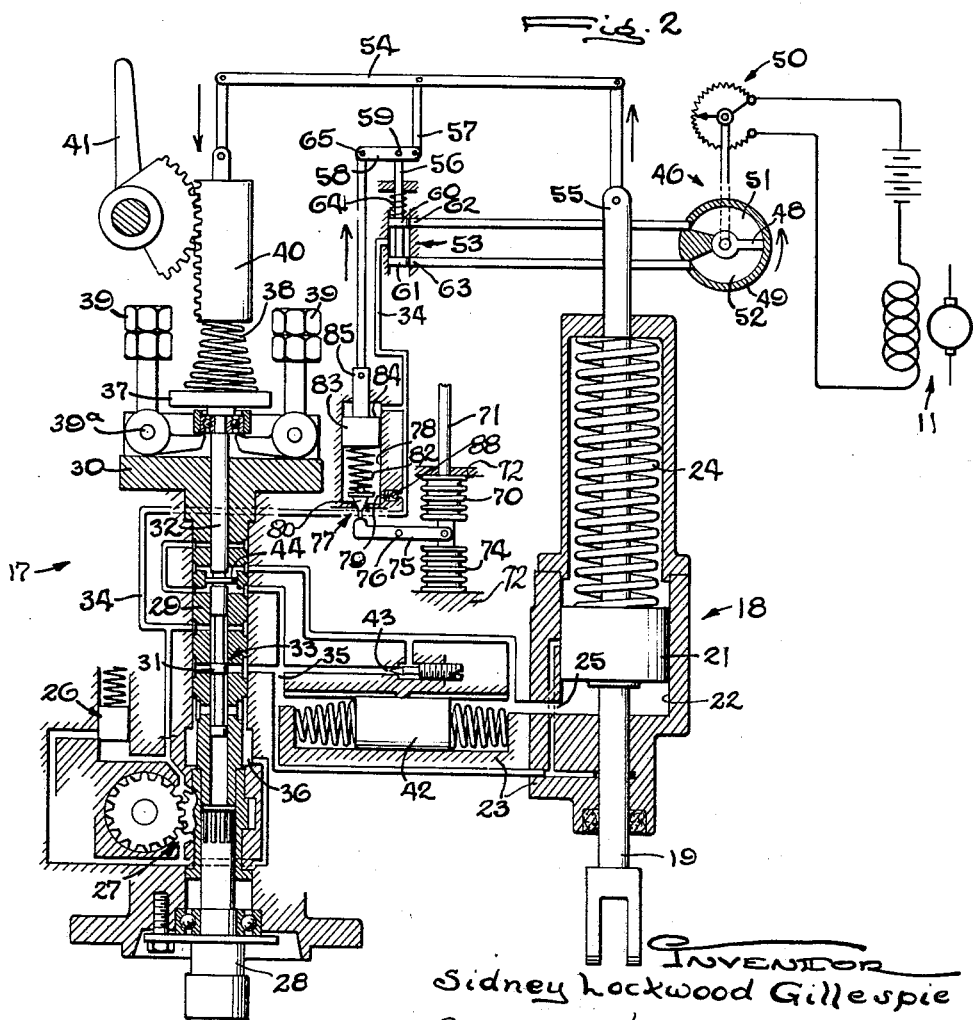
FIG. 2 is a fragmentary sectional view of a hydraulic circuit diagram of the improved control and its coupling with an engine driven electric generator.

At an intermediate point, the lever is connected to the stem 56 of the pilot valve 53 through a link 57 and a lever 58 having one end joined to the link and an intermediate point 59 pivoted on the valve stem. The valve lands 60 and 61 are spaced along the stem to close off ports 62 and 63 when the stem is in the centered position shown in FIG. 2. Lost motion in the linkage is taken up by a compression spring 64.

Assuming that the pivot 65 of the lever 58 is fixed, the arrangement is such that the left end of the lever 54 rises and falls as the speed setting of the governor and therefore the speed of the engine is decreased and increased respectively within a predetermined range between idle and full speeds as shown by the full and dotted lines in FIG. 4. The right end of the lever is raised and lowered by the fuel increasing and decreasing movements of the piston 21 between the idle and maximum fuel flows indicated in FIG. 4. Raising the valve stem above a centered position by either of these lever adjustments uncovers the port 62 to admit pressure fluid from the supply line 34 to the space 51 thus turning the vane 48 and the rheostat 50 clockwise so as to reduce the excitation of the generator and the load imposed on the engine. Such movement is permitted by drainage of fluid from the space 52 through the valve port 63. Conversely, lowering of the valve stem to admit pressure fluid through the port 63 and drain fluid through the port 62 results in counter-clockwise turning of the vane and a corresponding increase in the excitation of the generator.

The automatic load control above described operates in the following manner to maintain a fixed relation indicated at 67 (FIG. 5) between the engine speed and the fuel flow and therefore a constant horsepower output for each speed setting assuming that an adequate supply of air is available. Assume, for example, that the speed setting of the governor remains fixed and the load on the generator increases causing the engine to slow down and the governor to then increase fuel to the engine by upward movement of the piston 21. This movement raises the right end of the lever 54 thereby opening the valve 53 to admit pressure oil to the space 51 of the servo for turning the vane 48 clockwise so as to reduce the excitation of the generator field coils. With this reduction in total load, the engine speed will increase and the governor will now operate to reduce the flow of fuel to the engine by a downward movement of the piston 21. The reduction in the field current and the fuel to the engine will continue simultaneously until the engine speed has returned to the set point and the power piston 21 has returned to the desired point for the existing speed setting of the governor.

If the electrical load on the generator decreases, the motions of the various parts are reversed. This reverses the sequence of fuel and load adjustments outlined above which continues until the original engine speed and fuel supply have been restored and the proper engine loading re-established for the existing speed setting of the governor.

In response to movement of the control lever 41 to decrease the speed setting of the governor, the left end of the lever 54 is raised and the load control pilot valve is moved above center to admit pressure fluid to the space 51 causing the vane servo to turn counterclockwise and reduce the generator excitation. With the lower speed setting and lower excitation of the generator, the governor operates to decrease the fuel supply by moving the piston 21 downwardly thus lowering the right end of the lever 54 to return the pilot valve to its centered position and stop the movement of the vane servo. As a result of this sequence, decreases in the fuel supply, engine speed and field excitation produce a resultant decrease in engine horsepower output again providing the correct loading of the generator for the new speed setting.

Conversely, an increase in the governor speed setting is accompanied by lowering of the left end of the lever 54 and movement of the pilot valve below center. This allows pressure oil to flow to the space 52 of the vane 48 and the rheostat 50 thus increasing the generator excitation. The governor then operates to increase the fuel supply which is accompanied by raising of the right end of the lever 54 to return the pilot valve to center and stop the movement of the vane servo. The engine horsepower output and the generator output are thus adjusted to provide the correct loading for increased speed setting of the governor.

Through the use of a turbo-supercharger of the character described above, the available horsepower delivered by a diesel engine may be increased considerably because the absolute output pressure and therefore the weight of the air delivered is substantially unaffected by changes in altitude or ambient temperature. Since the turbine is driven by exhaust gases and possesses substantial inertia, the blower output lags behind the engine speed during acceleration. Thus, if the engine is accelerated rapidly, it will, with the speed, fuel flow, and load control above described, accept increased load before the supercharger delivers air at a rate sufficient to burn the fuel required. Smoking and bogging down of the engine results. This may happen also if the supercharger does not deliver the designed quantity of air due to erosion or clogging of the turbine elements or other deficiencies which may develop in service.

The present invention aims to overcome these inherent deficiencies of the turbo-supercharger, not by limiting the fuel flow as has been proposed heretofore, but rather by modifying the load control curve 67 as a function of the delivered air pressure so as to match the flow of fuel to the engine with the amount of air available at any time and thus deliver the maximum amount of fuel, indicated by the curve 87, that the engine is capable of consuming under existing conditions. To this end, the invention provides means for continuously measuring the pressure of the air delivered by the supercharger and correspondingly adjusting the mechanism controlling the load control pilot valve 53 so as to produce the desired speed-fuel flow characteristic curve 87.

The pressure senser may be built into the governor housing and preferably measures absolute air pressure. It includes a bellows 70 communicating at one end and through a pipe 71 with the discharge outlet of the supercharger 14. This end of the bellows is secured to an adjustable abutment 72 (FIG. 3) while the other end is closed and joined to the movable end of an evacuated reference bellows 74 fixed at its other end to an abutment 72. Through a lever 75 fulcrumed at 76, the motion of the connected ends of the two bellows is transmitted to the movable member 80 of a valve 77 which controls the escape of pressure fluid from a cylinder 78 continuously supplied from the line 34 through a restricted orifice 79. The conical member 80 of the valve is urged toward the valve seat 81 by a compression spring 82 acting against a piston 83 which slides in the cylinder 78 and has a narrow reduced area 84 (see FIG. 3) subjected continuously to pressure in the supply line 34.

The arrangement above described is typical of those which may be employed to position the rod 85 of the piston 83 accurately in accordance with the difference in pressure within the bellows 70 and 74. With the valve 77 partially closed, an increase in the air pressure will expand the bellows 70 and further open the valve 77 thus permitting fluid to escape from the cylinder faster than the inflow through the restriction 79. At the reduced pressure in the cylinder, the pressure on the narrow area 84 moves the piston downwardly thus compressing the spring 82 to overcome the bellows force and start closing the valve 77. The downward movement of the piston and closing of the valve continues until the increased force of the spring just balances the prevailing force exerted by the bellows 70, 74. This establishes a rate of leakage of fluid out of the cylinder 78 such that the spring force and the pressure on the lower end of the piston just balances the pressure on the upper piston area 84.

The valve opening thus established remains fixed so long as the air pressure is unchanged. In response to a decrease in pressure, the bellows 70 contracts allowing the valve 77 to move closer to its seat so as to further restrict the escape of fluid from the cylinder 78. This increases the pressure in the cylinder 78 and raises the piston 83 until the system is again in balance.

With the hydraulic amplifier thus provided and controlled by the bellows 70 and 74, the piston 83 is moved up and down with and in proportion to decreases and increases in the absolute air pressure in the discharge outlet of the supercharger. This motion of the piston 83 constitutes a pressure signal which is an accurate measure of the amount of air delivered by the supercharger under existing conditions of air density and the speed of the supercharger. This signal is combined with the speed and fuel flow signals above referred to and the resultant utilized in controlling the load control pilot valve 53. In the present instance, the combination is effected by connecting the rod 85 of the piston 83 to the point 65 on the lever 58. Thus, the point 65 is lowered and raised and the lever 58 rocked between the positions shown in full and phantom in FIG. 4 as the absolute pressure of the supercharger discharge varies between zero and a maximum. The spacing of the pivot points along the two floating levers 54 and 58 is such as to provide the ratios required for so correlating the operating strokes of the speed and fuel flow sensers as to impart the desired slope to the speed-flow curve 67 and then to modify this curve by increasing its slope as indicated at 87 in accordance with the changing rate of air delivery by the supercharger. In this way and through various service adjustments which may be made in the linkages and mountings, any operating characteristic that may be desired for a given engine may be obtained. It will be noted in FIG. 5 that the curves 67 and 87 substantially coincide over part of the speed range. This is because the flow of exhaust gas at low engine speeds in insufficient to cause the supercharger to increase the manifold pressure to a substantial degree.

It will be apparent that other types of mechanical linkages may be substituted for the two lever arrangement shown for combining the three signals that adjust the load control pilot valve 53. Thus, with a floating triangle link as disclosed in my Patent No. 2,496,284 the speed adjuster, the fuel flow piston, and the pressure senser would be coupled to the corners of the triangle. The resultant position is obtained by coupling an intermediate point on the triangle to the stem of the pilot valve 53.

After shutdown of the engine, the pressure in the supply line 34 falls and fluid tends to drain out of the cylinder 78. To prevent this and insure proper operation of the control on restarting the engine, a spring loaded check valve 88 is interposed in the restricted passage between the line 34 and the cylinder 78.

*Operation*

Considering now the operation of the load control as modified by introducing the pressure signal into the linkage controlling the pilot valve 53, let it be assumed that the engine is idling at a speed 90 (FIG. 5) so low that the supercharger does not materially increase the pressure of the air in the engine manifold. Now, if the setting of the governor is increased to the speed 91, the fuel flow and the engine speed will, by the action of the governor pilot valve 33 and the load control valve 53 as above described, increase along the curve 67 to the point 92. This is for the reason that the increase in the speed of the turbine 15 and the blower 14 lags behind the engine speed thus limiting the supply of air and preventing efficient consumption of fuel at the rate determined by the curve 87. But as the discharged exhaust gases overcome the inertia of the turbine and blower, the speed of the blower will increase thus producing a corresponding increase in the air discharged into the engine manifold.

Through the bellows 70 and 74, this increase in absolute pressure is converted into a corresponding downward motion of the left end of the floating lever 58. Since at this time, the right end of this lever is fixed by the speed adjuster and piston 21, the valve stem 56 is lowered thus admitting pressure fluid to the vane servo 48, 49 to increase the excitation and loading of the generator. As a consequence, the governor reacts to the resulting speed reduction thereby increasing the fuel flow and starting another sequence of fuel and load increasing actions as above described. The fuel flow is thus increased along the line 93 to match the available air supply which increases progressively with the pick-up in the turbine and blower speed.

The fuel flow is increased in a similar way when the change in the speed setting of the governor starts from a higher speed, for example at 94, and is increased to 95 for example. In this case and because the pressure delivered by the supercharger does not increase immediately, the speed and flow control through the lever 54 causes the fuel to be increased along a line 96 paralleling the curve 67 until the new speed 95 is reached. Then, as the supercharger speed picks up to correspondingly increase the available air supply, the pressure senser adjusts the lever 58 as before to initiate an increase in the loading of the engine and a resultant gradual increase in the fuel supply along the line 97 and to the point 98 on the curve 87.

In response to a rapid decrease in the speed setting of the governor and a consequent reduction in fuel flow, there will be a short interval during which the supercharger will deliver an oversupply of air. During this interval, the speed and fuel flow will decrease along a line parallel with the curve 67 and disposed above the curve 87, but will quickly drop to the curve 87 as the supercharger decelerates.

With the speed, fuel and load control modified as above described applied to a turbo-supercharged diesel engine, it will be apparent that the amount of fuel capable of being consumed by a given engine operating in the major upper part of its speed range may be increased substantially as compared with the speed-fuel control represented by the curve 67. As a result, the engine may be made to deliver maximum horsepower at all times.

An important advantage of the improved control is its ability to compensate automatically for deficiencies in the turbine or blower which may develop in service use, such for example, as erosion or clogging of the nozzles or blades. Such a reduction in the blower output for a given set of operating conditions is sensed by the bellows and the pressure senser and operates to reposition the lever 58 and reduce the load on the generator to a value corresponding to the quantity of air which is actually available. Thus, the system then operates along a curve 99 spaced below the curve 87 a distance which is proportional to the effect on the supercharger output produced by the existing deficiencies.

I claim as my invention:

1. The combination of, a fuel burning prime mover supplied with combustion air by a supercharger driven by exhaust gas discharged from said prime mover, a governor for regulating the flow of fuel to said prime mover, said governor having a movable speed setter and a member moved back and forth to adjust the flow of fuel to said prime mover to maintain operation thereof at the speed selected by said setter, continuously acting means combining the movements of said adjuster and member and operable to adjust the load imposed on said prime mover to maintain a fixed relation between the prime mover speed and the flow of fuel to the prime mover, means for continuously measuring the pressure of the air delivered to said prime mover by said supercharger, and mechanism continuously actuated by said measuring means and operable to modify the action of said movement combining means automatically in accordance with changes in said output pressure whereby to match the fuel flow and available air supply in spite of the lag of said supercharger in following an increase in speed of said prime mover.

2. The combination of, a fuel burning prime mover supplied with combustion air by a supercharger driven by a turbine actuated by exhaust gas discharged from said prime mover whereby the speed of the supercharger lags the prime mover during acceleration of the latter, a selectively adjustable governor for regulating the flow of fuel to said prime mover, said governor having a movable speed setter and a member moved back and forth to adjust the flow of fuel to said prime mover to maintain operation thereof at the speed selected by said setter, continuously acting means for measuring the pressure of the air delivered to said prime mover by said supercharger and having an element movable back and forth with changes in such pressure, a floating lever system continuously combining the movements of said setter, said member and said element, said lever system having an output device actuated in accordance with the resultant of said movements, and mechanism continuously responsive to changes in the position of said device and operable to adjust the load imposed on said prime mover to maintain a fixed relation between the prime mover speed setting, the flow of fuel to the prime mover, and the available air supply.

3. The combination of, a fuel burning prime mover supplied with combustion air by a supercharger driven by a turbine actuated by exhaust gas discharged from said prime mover whereby the speed of the supercharger lags the prime mover during acceleration of the latter, a governor for regulating the flow of fuel to said prime mover, said governor having a movable speed setter and a member moved back and forth to adjust the flow of fuel to said prime mover to maintain operation thereof at the desired speed selected by said setter, continuously acting means for measuring the pressure of the air delivered to said prime mover by said supercharger and having an element movable back and forth with changes in such pressure, a device movable back and forth and operable to adjust the load imposed on said prime mover, and mechanism continuously combining the movements of said setter, said member, and said element to produce a resultant movement of said device in the load-increasing direction in response to an increase in said desired speed or air pressure or a decrease in fuel flow.

4. The combination of, a fuel burning prime mover supplied with combustion air by a supercharger driven by exhaust gas discharged from said prime mover, a governor for regulating the flow of fuel to said prime mover, said governor having a movable speed setter and a member moved back and forth to adjust the flow of fuel to said prime mover to maintain operation thereof at a desired speed selected by said setter, means for continuously measuring the pressure of the air delivered to said prime mover by said supercharger and having an element movable back and forth with changes in such pressure due to the lag of said supercharger during acceleration of said prime mover, a reversible power servo operable in opposite directions to increase and decrease the load imposed on said prime mover, a device having a centered position and activating said servo to respectively increase and decrease said load when the device is disposed on opposite sides of said centered position, and mechanism continuously combining the movements of said setter, said member and said element to produce a resultant movement of said device in the load-increasing direction in response to an increase in said desired speed or air pressure or a decrease in fuel flow and in the load-decreasing direction in response to a decrease in such speed or air pressure or an increase in fuel flow.

5. The combination of, a fuel burning prime mover supplied with combustion air by a supercharger driven by a turbine actuated by exhaust gas discharged from said prime mover whereby the speed of the supercharger lags the prime mover during acceleration thereof, a governor for regulating the flow of fuel to said prime mover to maintain operation of the latter at a selected speed, said governor incorporating means for continuously indicating at least approximately the prime mover speed, means for continuously indicating at least approximately the torque being delivered by said prime mover, means continuously controlled by both of said indicating means and operable to adjust the load imposed on said prime mover so as to maintain a fixed relation between said prime mover speed and said torque, means for continuously measuring the pressure of the air delivered to said prime mover by said supercharger, and mechanism actuated continuously by said measuring means and operable to change said relationship automatically in accordance with each change in the pressure of the delivered air whereby to compensate for the lag of the turbo-supercharger during acceleration of the prime mover and thereby match the flow of fuel to the prime mover with the amount of air available at any time.

6. The combination as defined in claim 5 in which said measuring means measures the absolute pressure of the delivered air.

7. The combination of, a fuel burning prime mover supplied with combustion air by a supercharger driven by a turbine actuated by exhaust gas discharged from said prime mover whereby the speed of the supercharger lags the prime mover during acceleration thereof, a governor for regulating the flow of fuel to said prime mover to maintain operation of the latter at a selected speed, said governor incorporating means for continuously indicating at least approximately the prime mover speed, means for continuously indicating at least approximately the torque being delivered by said prime mover, means controlled by both of said indicating means and operable continuously to adjust the load imposed on said prime mover so as to maintain a fixed relation between said prime mover speed and torque and produce a predetermined fuel flow-speed curve, means for continuously measuring the pressure of the air delivered to said prime mover by said supercharger, and mechanism continuously actuated by said measuring means and operable to change said relationship automatically and increase the slope of said curve in accordance with increases in the pressure of the delivered air and thereby compensate for the lag in the speed of said turbo-supercharger during acceleration of the prime mover and match the flow of fuel to the prime mover with the amount of air available at any time.

References Cited in the file of this patent

UNITED STATES PATENTS

| | | |
|---|---|---|
| 2,281,987 | Oswald | May 5, 1942 |
| 2,306,277 | Oswald | Dec. 22, 1942 |
| 2,508,311 | Udale | May 16, 1950 |
| 2,562,742 | Rowe et al. | July 31, 1951 |
| 2,608,051 | Nettel | Aug. 26, 1952 |
| 2,884,918 | Klug | May 5, 1959 |
| 2,884,919 | Butler | May 5, 1959 |